US005438886A

United States Patent [19]

Knowles, Jr. et al.

[11] Patent Number: 5,438,886
[45] Date of Patent: Aug. 8, 1995

[54] VOLUMETRIC MEASUREMENT DEVICE FOR A DISPENSING CONTAINER

[75] Inventors: John H. Knowles, Jr., Essex, Mass.; DeeAnn I. Yabusaki, Lodi, Calif.

[73] Assignee: LittlePoint Corporation, Wakefield, Mass.

[21] Appl. No.: 324,229

[22] Filed: Oct. 17, 1994

Related U.S. Application Data

[62] Division of Ser. No. 988,224, Dec. 8, 1992, Pat. No. 5,383,373.

[51] Int. Cl.⁶ .................................................. G01F 13/00
[52] U.S. Cl. ........................................ 73/865.8; 222/106
[58] Field of Search ................... 73/865.8, 861, 149, 73/865.9; 33/562; 222/1, 23, 71, 106

[56] References Cited

U.S. PATENT DOCUMENTS

| | | | |
|---|---|---|---|
| D. 140,049 | 1/1945 | Davis | 33/562 X |
| D. 140,818 | 4/1945 | Klingelhofer | 33/524 X |
| 388,677 | 8/1888 | Hayes | 116/308 X |
| 612,296 | 10/1898 | Woodward | 116/308 X |
| 1,466,043 | 8/1923 | Graham | |
| 1,881,316 | 10/1932 | Horvath | 222/49 X |
| 2,027,494 | 1/1936 | Trabold | 73/428 X |
| 2,554,050 | 5/1951 | Neubeck | 73/426 X |
| 2,628,742 | 2/1953 | Kierulff | 222/23 |
| 2,720,114 | 10/1955 | Truffa | 73/428 |
| 4,075,769 | 2/1978 | Yung | 33/524 X |
| 4,160,819 | 7/1979 | Willer et al. | 424/45 |
| 4,161,262 | 7/1979 | Habrich | 222/1 |
| 4,483,619 | 11/1984 | Leveque et al. | 356/434 |
| 4,491,023 | 1/1985 | Graef | 73/861 |
| 4,532,937 | 8/1985 | Miller | 128/759 |
| 4,570,491 | 2/1986 | Machnee | 73/861 |
| 4,663,960 | 5/1987 | Makkink | 73/3 |
| 4,667,503 | 5/1987 | Loos | 73/3 |
| 4,668,218 | 5/1987 | Virtanen | 222/23 X |
| 4,693,122 | 9/1987 | Griffith | 73/861 |
| 4,941,520 | 7/1990 | Dowzall et al. | 141/114 |
| 5,176,291 | 1/1993 | Fillmore et al. | 222/1 |
| 5,211,894 | 5/1993 | Groh et al. | 264/40.1 |
| 5,253,534 | 10/1993 | Hamilton, Jr. | 73/861 |
| 5,383,373 | 1/1995 | Knowles, Jr. et al. | 73/861 X |

*Primary Examiner*—Thomas P. Noland
*Attorney, Agent, or Firm*—Testa, Hurwitz & Thibeault

[57] ABSTRACT

The present invention provides a dosing system and method for quickly and accurately indicating the proper volumetric dosage of a topical preparation. The container holding the topical preparation is provided with a pictorial representation of a measurement area which is equivalent to a known amount of the preparation when dispensed from the container to cover an equivalent area. A specialized instruction set is provided on the container which equates the represented area to dosage requirement such as age, weight, and/or effective application rate usually expressed as milliliters of topical preparation per square area of skin surface.

19 Claims, 5 Drawing Sheets

| AGE | WEIGHT | APPLICATION | DOSE |
|---|---|---|---|
| UNDER 2 YEARS | UNDER 28 LBS. | CONSULT PHYSICIAN | — |
| 2 – 6 YEARS | 28-48 LBS. | ONE MEASURED 3ml. AREA | 3 ml. |
| 6 – 12 YEARS | OVER 40 LBS. | TWO MEASURED 3 ml. AREAS | 6 ml. |

FIG. 3

VOLUMETRIC MEASUREMENT DEVICE FOR A DISPENSING CONTAINER

This is a divisional of application Ser. No. 07/988,244 filed on Dec. 8, 1992 and now U.S. Pat. No. 5,383,373.

BACKGROUND OF THE INVENTION

This invention relates to measuring the dosage of topical preparations such as lotions, insect repellants, and medicaments.

Topical preparations are commonly contained in and administered from flexible containers such as plastic bottles and tubes. Some topical preparations containing active ingredients, such as insect repellants and medicaments, should only be applied to the skin in well-controlled dosages to provide an effective result without over exposing the user to the active ingredients. Typically, the dosage for a topical preparation is described in written terms which usually indicate how often the topical preparation should be applied to the skin, but are typically vague or nondescript as to how much of the preparation should be applied for each dosage.

SUMMARY OF THE INVENTION

The present invention provides a dosing system and method for quickly and accurately indicating the proper volumetric dosage of a topical preparation. The container holding the topical preparation is provided with a pictorial representation of a measurement area which is equivalent to a known amount of the preparation when dispensed from the container to cover an equivalent area. A specialized instruction set is provided on the container which equates the represented area to dosage requirement such as age, weight, and/or effective application rate usually expressed as milliliters of topical preparation per square area of skin surface.

In general, in one aspect, the invention features a container for dispensing a topical preparation contained therein. The container includes an aperture for metering the flow of the preparation from the container, and a measurement area displayed on the container corresponding to a particular volumetric dosage of the preparation when the preparation is dispensed through the aperture to cover a like measurement area.

In preferred embodiments, the container contains insect repellant, a medicament, or other preparations including active ingredients. Preferred embodiments of the container include a flexible bottle, a squeezable tube, and a container featuring a manual pump.

In other preferred embodiments, the container includes a specialized dosage instruction displayed on the container and having a reference to the measurement area for determining proper dosage. In preferred embodiments, the dosage instructions include dosage by weight, by age, and/or by skin area to be covered by the preparation. In yet other preferred embodiments, the dosage instructions include measuring a total dosage by applying a plurality of partial dosages each measured by comparison to the measurement area.

In general, in another aspect, the invention includes a method for measuring the dosage of a topical preparation dispensed from a container by applying the preparation to the skin in a pattern shaped and sized to resemble an identified area displayed on the container, and comparing the pattern of preparation dispensed on the skin to the identified measurement area to determine the dosage of the preparation dispensed.

Preferred embodiments of the method include repeating the process to obtain the total required dosage. In yet other preferred embodiments the preparation is applied to the skin in amounts specified by specialized instructions, and is determined by the weight of the person, the age of the person, and/or the skin area to which the preparation is to be applied.

BRIEF DESCRIPTION OF THE DRAWINGS

The foregoing and other objects, features and advantages of the invention would be apparent from the following more particular description of preferred embodiments of the invention, as illustrated in the accompanying drawings in which like references characters refer to the same parts throughout the different views. The drawings are not necessarily to scale, emphasis instead being placed upon illustrating the principals of the invention.

FIG. 3 illustrates the format of the specialized instruction table for use with the measurement area of this invention.

DESCRIPTION OF THE PREFERRED EMBODIMENT

Figure 1:
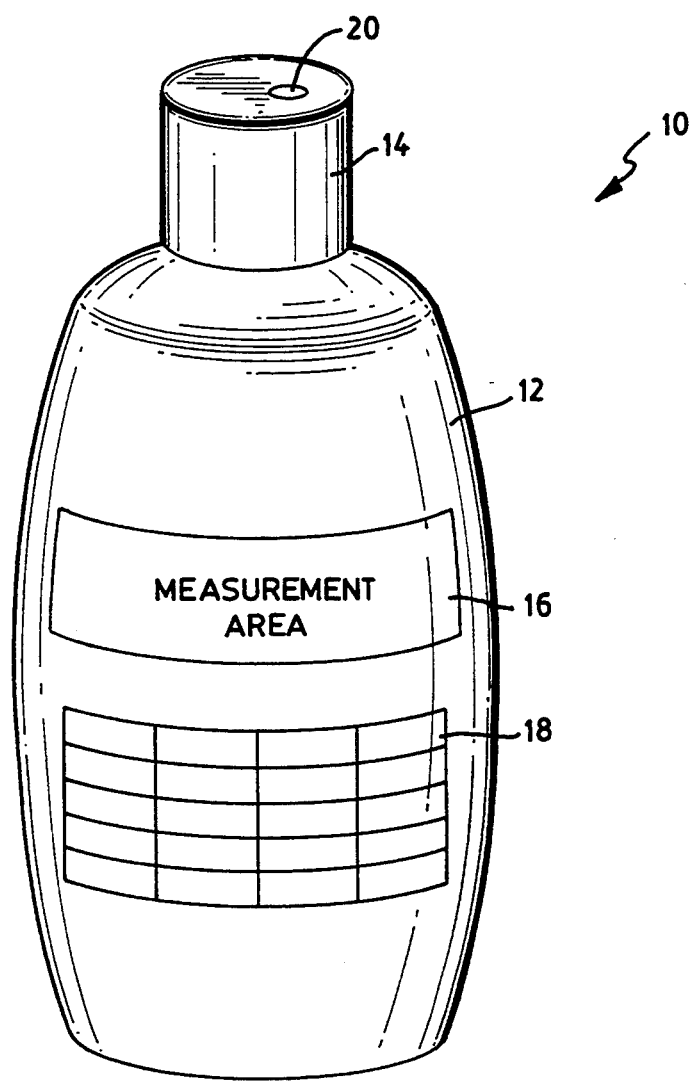
FIG. 1 is a plan view of a container featuring the dosage measuring system of this invention including a measurement area and a specialized instruction set.

Referring to FIG. 1 a container 10 for holding a topical preparation and featuring the dosage system of this invention includes a container 12 having a top 14, a pictorial representation of a measurement area 16 displayed on the container 12, and a specialized instruction set 18 also displayed on the container 12. Container top 14 includes an aperture 20 for metering the flow of the preparation from the container 12. Preferably, the container 12 can be a flexible "squeeze" bottle allowing the preparation to be forced out of the bottle through the aperture 20 in bottle top 14.

The measurement area 16 displayed on container 12 is sized and shaped to represent the area covered by a predetermined volume of the preparation when dispensed from container 12 through aperture 20. For instance, in one preferred embodiment, the area represents 3 ml. of the preparation when dispensed from the bottle in a manner to cover an equivalent area, i.e., an area of the same size and shape. In operation, a person dispenses the preparation into his or her hand in an area equivalent in size and shape to measurement area 16. By comparing the dispensed portion to the measurement area, the person can get a very good estimate of the amount of preparation dispensed from the container. The hands are then rubbed together and used to spread the preparation over the skin area to be covered. This can be repeated in the case where the measurement area 16 only represents a partial dosage.

Figure 2:
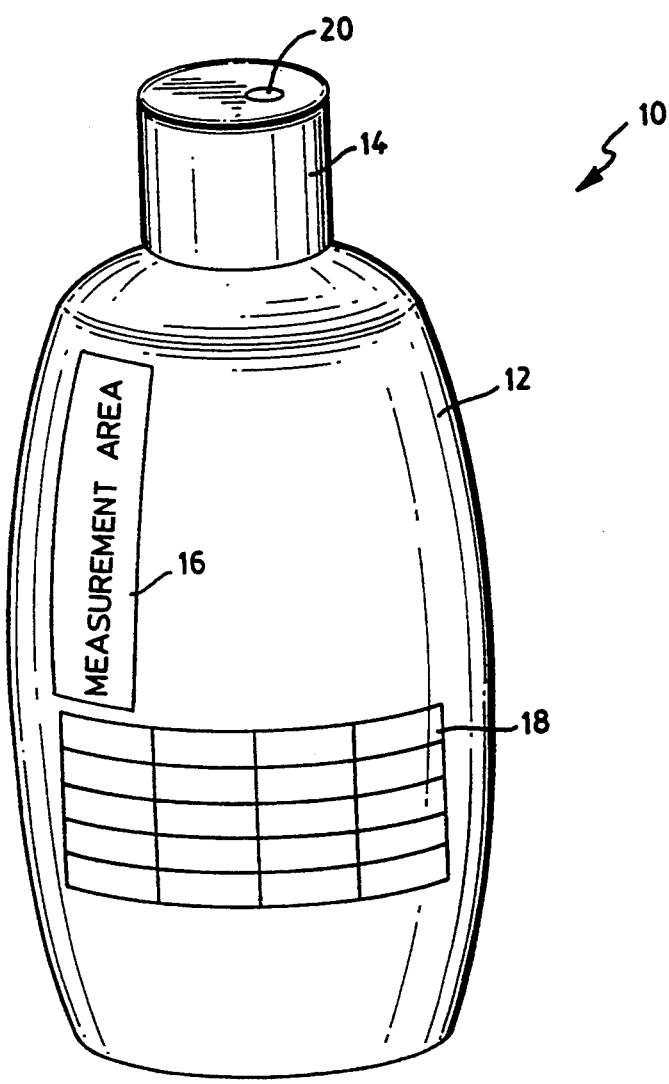
FIG. 2 is a plan view of another embodiment of a container featuring the dosage measuring system of this invention.

The measurement area 16 can be displayed in various orientations on the container 12. For instance, in the preferred embodiment shown in FIG. 1, measurement area 16 is positioned horizontally across the back of container 12. In another preferred embodiment, shown in FIG. 2, measurement area 16 is positioned vertically along the edge of the container, which allows for easy comparison of the measurement area on the container to the area covered by the topical preparation dispensed from the container. Furthermore, the measurement area 16 can be printed or embossed directly onto the container or printed onto a label to be attached to the container.

Referring to FIG. 3, there is shown an example of a specialized instruction set 18 for use in conjunction with the measurement area 16. Instruction set 18 is shown configured as a table broken down into categories such as AGE 22, WEIGHT 24, APPLICATION 26, and DOSE 28 columns. The AGE column 22 divides the table into age specific rows, specifically for children under 2 years of age 30, 2 to 6 years of age 32, and 6 to 12 years of age 34. Of course, other age breakdowns can also be used, including adult dosages. The WEIGHT column 24 divides the table into weight specific categories generally, corresponding to the breakdown of ages in the AGE column. Specifically, weights under 28 lbs. 36 correspond to children under 2 years of age 30, weights between 28 to 48 lbs. 38 correspond to children between 2 to 6 years of age 32, and weights over 48 lbs. 34 correspond to children 6 to 12 years of age 40. It should be noted that because skin area is more accurately related to weight than to age, where a person falls into an age category but not into its corresponding weight range, it is usually preferable to use weight to determine dosage of the topical preparation.

Each entry of the AGE 22 and WEIGHT 34 columns corresponds to an entry into the APPLICATION 26 and DOSE 28 columns. The entry into the APPLICATION column shows the corresponding dosage for each corresponding age and weight in terms of the number of measured areas 16 of the preparation to be applied to the skin. The DOSE 28 column shows a corresponding resulting dosage in milliliters. For instance, for children 2 to 6 years old 32 or 28 to 48 lbs. 38, one measured 3 ml. area is to be applied to the skin. For children 6 to 12 years old 34 or over 48 lbs. 40, 2 measured areas 16 are applied to the skin. For children under age 2 years old 30 or under 28 lbs. 36, no application dosage is recommended and the user is directed to consult a physician.

Generally, the age and weight breakdown are contingent upon the population using the topical preparation. For example, if children are the target population, age and weight breakdown should be consistent with universal growth charts. For adults, weight and height are a better indicator of skin surface area than age.

Figure 4:
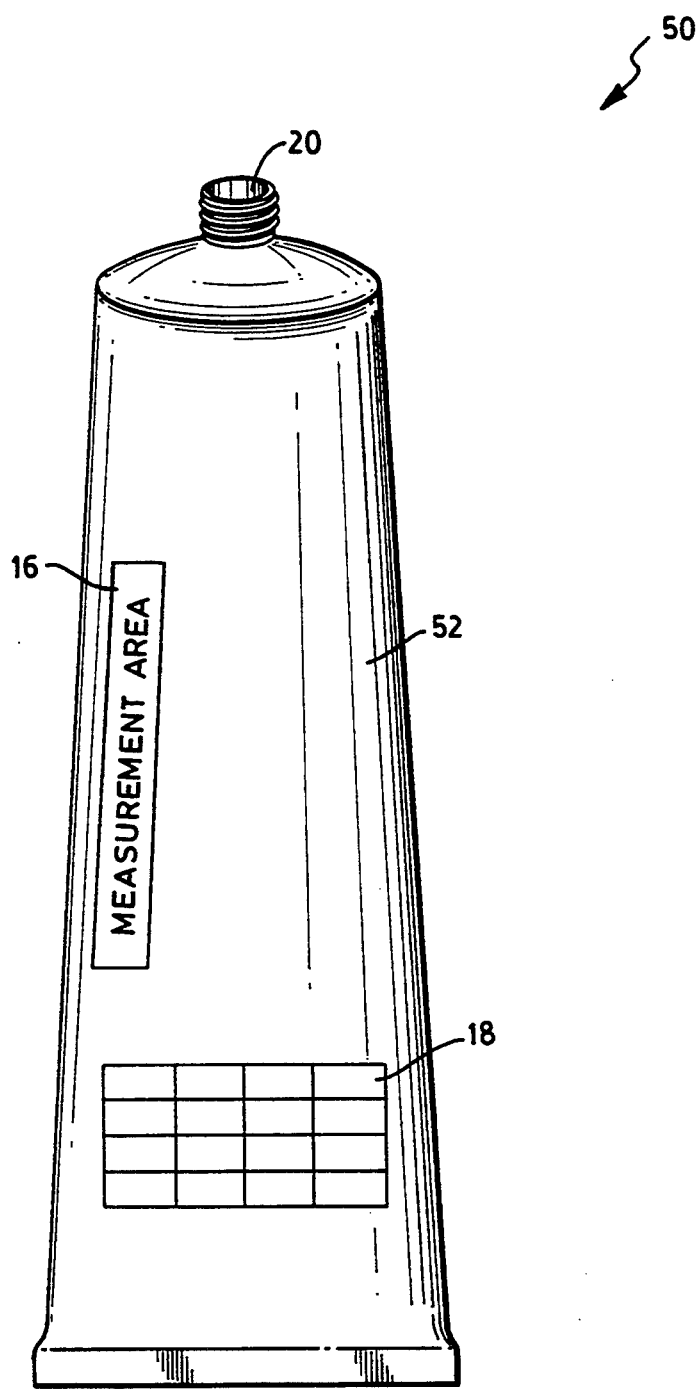
FIG. 4 is a plan view of a flexible tube container featuring the dosage measuring system of this invention.

Referring to FIG. 4, there is shown another preferred embodiment 50 of this invention featuring a "squeezable" tube container 52 for holding the topical preparation. For topical preparations which have a consistency of paste or gel, measurement area 16 can be sized and shaped to essentially measure the length of a bead of the preparation discharged from the tube 52 through aperture 20. In the case when the preparation is liquified, the measurement area 16 can be sized and shaped to account for the anticipated spreading of the preparation once discharged from the container 52.

Figure 5:
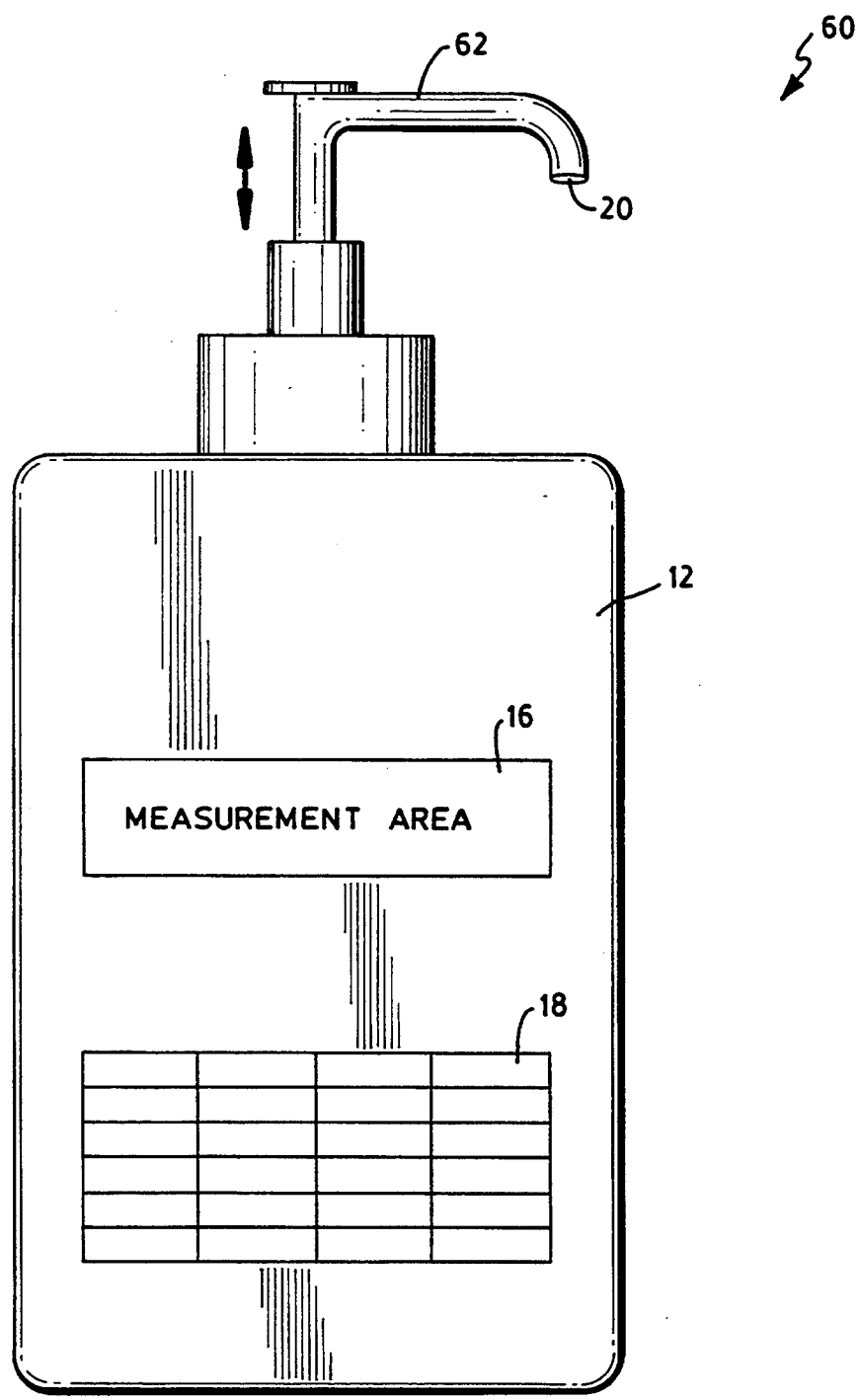
FIG. 5 is a plan view of a container having a manual pump and featuring the dosage measuring system of this invention.

Referring to FIG. 5, there is shown another preferred embodiment 60 of this invention featuring a manually operated pump 62 for drawing the preparation from the container 12 for ejection through aperture 20 at the end of pump 62. Again, measurement area 16 is used in conjunction with instructions 18 to provide the proper dosage.

While this invention has been particularly shown and described to preferred embodiments thereof, it would be understood by those skilled in the art that various changes in form and detail may be made therein without departing from the spirit and scope of the invention as defined by the appended claims. For instance, although only several types of containers were described herein, this invention is equally applicable to a wide variety of container types, including rigid glass, plastic or metallic bottles and cans. Similarly, although only several types of preparations were described herein, this invention is equally applicable to any preparation to be used in a controlled volume.

What is claimed is:

1. An apparatus for dispensing a topical preparation, comprising:
   a container for containing the preparation and having an aperture for metering the flow of the preparation from the container; and
   a measurement area in the form of a geometrically shaped area displayed on the container and corresponding to a particular volumetric dosage of the preparation when the preparation is dispensed through the aperture to cover a like measurement area.

2. The apparatus of claim 1 wherein the topical preparation comprises insect repellant.

3. The apparatus of claim 1 wherein the topical preparation comprises a medicament.

4. The apparatus of claim 1 wherein the topical preparation comprises active ingredients.

5. The apparatus of claim 1 further comprises a specialized dosage instruction displayed on the container including a reference to the measurement area for determining proper dosage.

6. The apparatus of claim 5 wherein the dosage instructions comprise dosage by weight.

7. The apparatus of claim 5 wherein the dosage instructions comprise dosage by age.

8. The apparatus of claim 5 wherein the dosage instructions comprise dosage by the skin area to be covered by the preparation.

9. The apparatus of claim 5 wherein the dosage instructions comprise measuring a total dosage by applying a plurality of partial dosages each measured by comparison to the measurement area.

10. The apparatus of claim 1 wherein the container comprises a flexible bottle.

11. The apparatus of claim 1 wherein the container comprises a squeezable tube.

12. The apparatus of claim 1 wherein the container comprises a manually operated pump for pumping the preparation from the container through the aperture.

13. An apparatus for dispensing a topical preparation, comprising:
   a container for containing the preparation and having an aperture for metering the flow of the preparation from the container;
   a measurement area in the form of a geometrically shaped area displayed on the container and corresponding to a particular volumetric dosage of the preparation when the preparation is dispensed through the aperture to cover a like measurement area; and a specialized dosage instrumentation displayed on the container including a reference to the measurement area for determining proper dosage.

14. The apparatus of claim 13 wherein the topical preparation comprises insect repellant.

15. The apparatus of claim 13 wherein the topical preparation comprises a medicament.

16. The apparatus of claim 13 wherein the topical preparation comprises active ingredients.

17. The apparatus of claim 13 wherein the dosage instructions comprise dosage associated to the skin area to be covered by the preparation.

18. The apparatus of claim 13 wherein the container is flexible.

19. The apparatus of claim 13 wherein the container comprises a manually operated pump for pumping the preparation from the container through the aperture.

* * * * *